INVENTOR:
ARVID E. ENGLUND, JR.

BY Joseph P. Kates
HIS ATTORNEY.

United States Patent Office 3,002,114
Patented Sept. 26, 1961

3,002,114
D.-C. TO D.-C. VOLTAGE MULTIPLIER
Arvid E. Englund, Jr., North Syracuse, N.Y., assignor to General Electric Company, a corporation of New York
Filed Dec. 16, 1957, Ser. No. 703,041
9 Claims. (Cl. 307—110)

The present invention relates to a D.-C. to D.-C. voltage multiplier and more particularly relates to a D.-C. to D.-C. converter circuit adaptable to utilize one or a plurality of signal translating devices such as semi-conductors or transistors and associated components to provide an output D.-C. voltage which will be a predetermined multiple of but which may be an integer plus a decimal times an applied D.-C. voltage.

In accordance with the principles taught by the present inventive apparatus and method, an output D.-C. voltage may be produced which voltage constitutes an algebraic function greater than unity times an input D.-C. voltage. The invention taught herein thus has application to many uses as, for example, providing a voltage greater than a voltage supply source such as may be required for an automobile battery, providing voltage or power amplification in transmitter and receiver apparatus, for computer applications requiring accuracy and for various other industrial, military, business and academic applications wherein a simple, economical, compact, rugged apparatus requiring comparatively little source power and adaptable to field use wherein a source of electric current may not be available is necessary. Similarly the inventive method provides a simple and inexpensive yet exact means for providing a voltage output which will be of greater magnitude than the voltage input.

Prior art multipliers had several disadvantages which the present invention overcomes including relative complexity, difficulty in providing continuous and reliable operation, relatively short life, being subject to shock and vibrations in use and prior art devices required expensive components such as transformers and parts necessarily held within close tolerances which parts were easily destructible and which required frequent testing and replacement and which underwent frequent breakdowns and failures in operation.

The present invention overcomes these and other deficiencies of the prior art and in addition provides several important advantages, for example, the present invention is capable of utilizing an extremely low voltage source, for example, of the order of one half volt, which may be supplied by a battery, can be readily used in field operations where electric power is not available, may be also operated up to the maximum voltage at which a particular semi-conductor, transistor, unilateral current flow device, neon tube, or other variable impedance can be operated without breakdown, it requires relatively few components, dispenses with the need for a transformer, gives accuracy within close tolerances in operation, dispenses with the use of frangible parts and is rugged and very economical as well as capable of being operated over a wide range of input voltage and which will maintain accuracy throughout its life dispensing with necessity for frequent testing and replacement of parts.

Accordingly, an object of the present invention is to provide a circuit incorporating relatively few components capable of accurately performing a D.-C. to D.-C. multiplication function.

Another purpose of the present invention is to provide a multiplier capable of multiplying a given D.-C. input voltage and which will perform satisfactorily without the use of transformers.

Another aim of the present invention is to provide a D.-C. to D.-C. converter which may be constructed with components capable of withstanding vibration and shock or which are conveniently capable of shockproof mounting and wherein the apparatus may be satisfactorily operated over a wide range of power input requirement, for example, as low as of the order of about one half a volt and extending to the maximum capabilities of a signal translating device or other nonlinear impedance.

Another object of the present invention is to provide a device capable of being cascaded to provide particular voltages and which device will be readily adapted to usage in portable equipment and can be operated where an external electric power source is not readily available.

Another object of the present invention is to provide a relatively high voltage in circuits wherein only one or a few such voltages are required and wherein it is not desired to provide a complicated and costly power supply to provide such needed voltage.

While the novel and distinctive features of the invention are particularly pointed out in the appended claims, a more expository treatment of the invention, in principle and in detail, together with additional objects and advantages thereof, is afforded by the following description and accompanying drawings in which:

Figure 1:
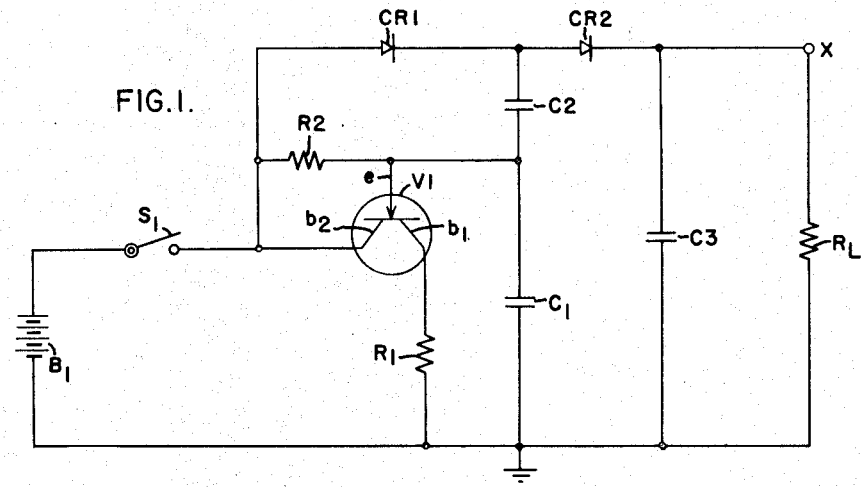
FIG. 1 is a schematic representation of a preferred illustrative embodiment of the present invention.

Referring to the drawings and in particular to the schematic diagram of FIG. 1, a semi-conductor or other similar signal translation device V1, may be provided. For example, the General Electric Company transistor known popularly by the name "double base diode" or "unijunction transistor" may be utilized as stage V1 and may comprise an emitter $e$, a first base or ohmic electrode $b1$ and a second base or ohmic electrode $b2$. Electrically connected to base $b2$ and in series therewith may be a switch member S1. Switch S1 may be a single pole, single throw switch and may have one end electrically connected to the positive terminal of a D.-C. source such as a battery B1. If desired other switching means such as an electronic switching means can be provided for the device S1. The negative terminal of the battery or D.-C. source B1 may be connected to one end of a resistor R1, the other end of resistor R1 being tied to a second base $b1$ of the signal translation device V1. As will be explained hereinafter resistor R1 is a current limiting resistor to limit the current discharged from the emitter $e$ to the base $b1$ to thus keep current flow within the necessary rating of the device V1 and to prevent breakdown of that device. A charging capacitor C1 (electrical storage device) may be disposed between ground and the emitter $e$ of the semi-conductor device. Resistor R1 and the negative terminal of battery B1 may also be grounded. Disposed between the emitter $e$ and the base $b2$ of the semi-conductor device may be a charging resistor R2 to permit charging capacitor C1 to become charged upon initial closing of switch S1 in a manner to be hereinafter described. Connected across resistor R2 may be in series a rectifier or diode CR1 and a second charging capacitor C2. Rectifier CR1 may be a conventional crystal rectifier. The cathode of rectifier CR1 may be directly connected to one plate of capacitor C2, the anode of rectifier CR1 being electrically tied to the end of the resistor R2 opposite the emitter connected end of that resistor. The other plate of capacitor C2 may be directly connected to the emitter $e$ of semi-conductor V1 and concurrently may be connected to that plate of capacitor C1 opposite its grounded plate. At the junction between rectifier CR1 and capacitor C2 may be electrically tied the anode (or plate) of a second rectifier CR2, the cathode of CR2 being connected to one plate of a third capacitor C3 which capacitor C3 may be disposed between the cathode of rectifier CR2 and ground. Across capacitor C3 may be disposed an output load resistor $R_L$.

The circuit of FIG. 1 may be operated as follows: Upon the closing of switch S1, a potential gradient is established across the semiconductor body of V1 in accordance with the operation of unijunction transistors. Initially, capacitor C1 will become charged through resistor R2, the charging circuit comprising the positive terminal of D.-C. source B1, switch S1, resistor R2, capacitor C1 and the negative terminal of source B1. When capacitor C1 has charged up to a sufficient voltage, depending upon the characteristics of the particular signal translating device or semi-conductor V1 utilized, such that the voltage between the emitter and the base $b1$ is sufficient to cause current flow from the emitter to base $b1$ then the emitter $e$ to base $b1$ path of the signal translating device V1 will present a very low impedance compared with the impedance of resistor R2 to the flow of current therethrough and capacitor C1 will start to discharge through the signal translating device V1 and through resistor R1 to ground.

At the time of discharge of capacitor C1, the emitter $e$ is at very close to ground potential and therefore capacitor C2 will become charged by current flow from the positive terminal of D.-C. source B1 through switch S1 and rectifier CR1. Simultaneously, capacitor C3 will be charged, its charging path being from the positive terminal of D.-C. source B1, through switch S1, rectifiers CR1 and CR2 and capacitor C3 to ground. Capacitors C3 and C2 are then each charged at approximately the battery source potential since at this time capacitor C3 and capacitor C2 have been charged through rectifiers CR1 and CR2 to the battery B1 voltage. When the emitter voltage reaches the value where the impedance between the emitter and the base $b1$ connected to resistor R1 becomes high, capacitor C1 begins to charge again bringing up the voltage on the lower plate (or terminal) of capacitor C2 above ground. Since the upper plate of charged capacitor C2 is already at approximately the potential of the positive terminal of the voltage source B1 and the charge or voltage across capacitor C2 cannot be discharged, being blocked at the anode of rectifier CR2, the potential at the upper plate of capacitor C2 between rectifiers CR1 and CR2 will be carried above the voltage at the positive terminal of the D.-C. voltage source B1. That is, the charging action of capacitor C1 plus the voltage across capacitor C2 brings the upper plate of capacitor C2 to a level above the source voltage level. Inasmuch as capacitor C2 is a linear impedance the potential difference or voltage across capacitor C2 will remain substantially constant and therefore the effect of charging of capacitor C1 causing the voltage at the lower plate of capacitor C2 to rise also causes the voltage at its upper plate to rise to thereby cause the upper plate of capacitor C2 to become substantially above the voltage of the positive terminal of voltage source B1. Since the upper plate of capacitor C2 is now at a positive potential above the battery voltage, capacitor C3 will become charged so that its upper plate will also be at substantially the same potential as the upper plate of capacitor C2. Simultaneously the load resistor $R_L$ will have current flow therethrough from the upper plates of capacitors C3 and C2 to ground to develop a voltage thereacross thereby causing a positive voltage at point X which positive voltage is above the battery or voltage source B1 potential. Thus, there is provided an output voltage at point X which will be equal numerically to the initial voltage of the voltage source B1 plus the voltage to which capacitor C1 has become charged. The cycle is repeated thereby producing a D.-C. voltage across resistor $R_L$ higher than that of the voltage source B1. Capacitor C3 as has been described provides filtering in its charging and discharging action to provide a substantially constant output load voltage across resistor $R_L$. Subsequent action of the transistor V1 is therefore very much like a switching device to cause sequential charging and discharging of the capacitors in the circuit. It also holds the junction between capacitors C1 and C2 normally at about ground potential, allowing this grounding long enough for capacitor C2 to become initially charged and to permit the further action whereby the charging of capacitor C1 gives a boost to the terminal voltage at the upper plate of capacitor C2.

In a particular embodiment wherein the above-described particular General Electric component was used, the circuit operated very satisfactorily to multiply the input D.-C. voltage by a factor of 1.7 and values of particular components utilized will be shown by way of example, hereinbelow.

Figure 2:
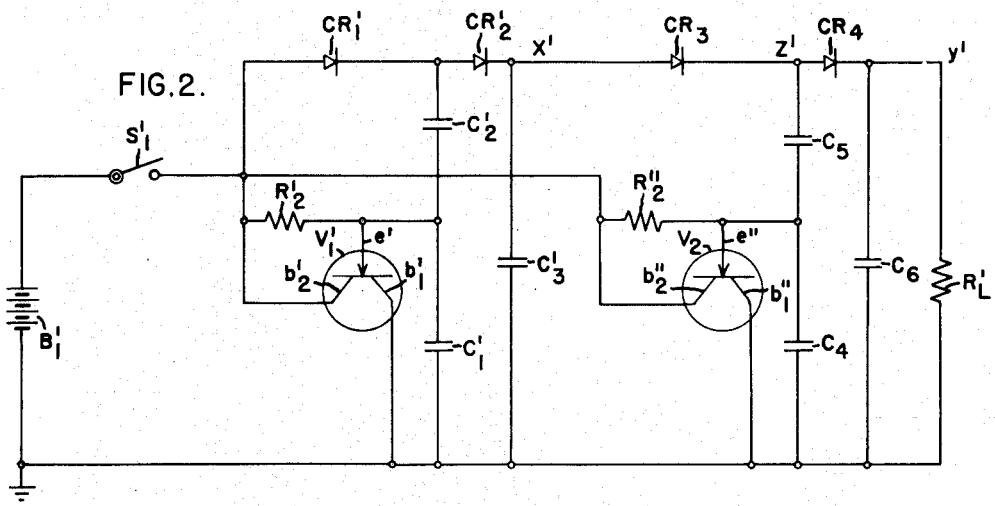
FIG. 2 is a schematic representation of another preferred illustrative embodiment of the present invention for producing relatively high voltage output and wherein a modified cascaded arrangement is shown.

Referring now more particularly to the showing of FIG. 2, the circuit includes a source of D.-C. voltage which may be a battery B1', for example. The D.-C. voltage source B1' may be grounded at its negative terminal and to its positive terminal may be connected one side of a switch S1. A transistor, semi-conductor or other signal translating device V1' may be provided and may have an emitter $e'$, a first base $b1'$ and a second base $b2'$. Base $b2'$ may be directly connected to the side of the switch S1' opposite its D.-C. voltage source connected end. Disposed between the emitter $e'$ and the base $b2'$ may be a charging resistor R2'. The first base $b1'$ of the transistor device V1' shown may be directly connected to ground. Disposed across the emitter $e'$ to base $b1'$ may be a capacitor C1'. Connected between the switch S1' at the end opposite its D.-C. voltage connected end and the emitter $e'$ may be in series a rectifier CR1' and a second capacitor C2', the cathode of rectifier CR1' being connected to the upper plate of capacitor C2' and the switch S1' being connected to the anode of rectifier CR1'. Disposed at the junction between rectifier CR1' and capacitor C2' may be the anode of a second rectifier CR2', the anode of rectifier CR2' being directly connected to the cathode of rectifier CR1'. Between the cathode of rectifier CR2' and ground may be disposed a capacitor C3'. This portion of the circuitry of FIG. 2 may be operated in a manner similar to the above-described operation of the corresponding portion of the circuit shown in FIG. 1 with the exception that a current limiting resistor corresponding to R1 is not required in the operation of the circuit of FIG. 2 when D.-C. to D.-C. voltage multiplication functions are to be performed. To the end of switch S1' opposite the end connected to the positive terminal of the D.-C. voltage source may be connected the base $b2''$ of a transistor or signal translating device V2. Device V2 may be of the type hereinabove described and may also include an emitter $e''$ and a base $b1''$. Disposed between the emitter $e''$ and the base $b2''$ may be another charging resistor R2''. Disposed between the emitter $e''$ and the base $b1''$ of device V2 may be a capacitor C4. Capacitor C4 and base $b1''$ may be grounded at the junction point between these elements. Disposed between the cathode of rectifier CR2' and the emitter $e''$ may be respectively disposed a rectifier CR3 and a capacitor C5, with the anode of rectifier CR3 connected to the cathode of CR2'. At the junction between the rectifier CR3 and the upper plate of capacitor C5 may be the anode (or plate where the anode is a plate) of a rectifier CR4. To the cathode of rectifier CR4 may be electrically tied the upper plate of a condenser C6, the lower plate of condenser C6 being electrically connected to ground. Across capacitor C6 may be disposed the output load resistor $R_L'$.

Operation of the circuit of FIG. 2 occurs as follows:

The portion of the circuit shown at the left hand side of FIG. 2 including capacitor C3' operates substantially similarly to the operation of the similar circuit shown in FIG. 1 and the potential at X' in the embodiment shown may be approximately 1.7 times the voltage of the D.-C. voltage source B1'. It has been shown in the description of FIG. 1 how a voltage of substantially 1.7 times the input source voltage is produced at the point labeled X in that figure and similarly this 1.7 times the input D.-C. source voltage may be produced at the point labeled X' in FIG. 2. Capacitors C4 and C5 being across capacitor C3', these capacitors C4 and C5 will charge through rectifier CR3 so that the voltage at Z' will be the same voltage as the voltage at point X'. The base $b2''$ being connected to the positive terminal of voltage source B1', when switch S1' is in closed position, the end of the resistor R2'' connected to switch S1' will permit the charging of capacitor C4 from the positive terminal of D.-C. source B1' through resistor R2'', capacitor C4 to ground. At a time when capacitor C4 has been charged up to 7/10 of the input source voltage at B1' the device V2 will start to conduct from the emitter $e$ to the base $b1$ because this path then presents a low impedance path to current flow. In operation the capacitor C4 will start to charge up through resistor R2'' and through switch S1' to the positive terminal of D.-C. voltage source B1'. This will occur until the emitter $e''$ is at a potential approximately 7/10 to the potential of the input source voltage. At this point the emitter $e''$ will be negatively biased with respect to base $b2''$. That is, in its charging path electron current flow will be caused from the upper plate of capacitor C4 toward the positive terminal of the voltage source, so that a voltage is developed by electron flow through resistor R2'' such that base $b2''$ is positive with respect to the emitter $e''$. This causes current flow through the signal translating device V2 which then presents a very low impedance to further current flow. Upon the device V2 conducting, capacitor C4 then starts to discharge through the device V2 between its emitter $e''$ and its base $b1''$ which is grounded through the element. Because the device V2 presents a relatively very tiny impedance in the discharge path of capacitor C4 this action is very rapid. Upon the discharge of capacitor C4, the emitter $e''$ will be at substantially ground potential and therefore substantially the entire voltage appearing across the plates of capacitor C3' will be now across the plates of capacitor C5. On the next cycle upon charging of capacitor C4, capacitor C5 will have its lower plate at a relatively positive potential with respect to ground which will lift the linear impedance device or capacitor C5 above ground potential since the voltage across that capacitor will not change and therefore will lift point Z' well above the initial voltage of 1.7 times the voltage at the source which appeared at X'. Capacitor C5 cannot discharge through unilateral current flow device CR3 because the plate to cathode direction presents a high impedance path to discharge of capacitor C5 through the device CR3. However, a low impedance path is provided through capacitors C6 and through the rectifier CR4 for discharge of capacitor C5. The voltage at Z' which in the illustrative embodiment shown can be 2.4 times the input voltage of source B1' will then appear at Y' and this voltage may be developed across the output load $R_L'$ by discharge of capacitor C6 which acts as a filter capacitor with that resistor. Since discharge through resistor $R_L'$ of capacitor C6 averages or keeps the voltage at a relatively constant 2.4 times the input voltage because of the low impedance path through rectifier CR4 to the plate of C5 this voltage will be maintained throughout the period of the cycle. When the capacitor C6 has completed its discharge through the load resistor $R_L'$, the cycle involving capacitor C4 and the semi-conductor or other equivalent device V2 repeats with the result that capacitor C3' charges capacitor C5 through the rectifier CR3 to again establish positive potential at a point 2.4 times the voltage source voltage. Thus by the institution of the two relatively independent actions of (1) capacitor C5 being charged by capacitor C3' which thus acts as an input source and (2) the action of capacitor C4 and the circuitry of transistor V2 causing cyclical change of potential at the emitter $e''$, capacitor C5 is alternately allowed to approach a predetermined voltage of 2.4 times the voltage of the input source and to go to the voltage of 1.7 times the input source appearing at point X'. It should be understood that in the previous sentence the input source is considered as the original source of voltage input device B1'.

It will be appreciated, of course, that although the representations of FIG. 1 and FIG. 2 present preferred illustrative embodiments, other types of devices could be used to perform the functions of the above-described invention in the manner taught, also depending upon circuit constants predetermined voltages other than 1.7 and 2.4 times the input voltage can be obtained. However, by way of illustration and in nowise to be construed as limiting the scope of the present invention, it is contemplated that devices for stages V1, V1', and V2 may be utilized, which devices are of the general type known as the General Electric unijunction transistor and also known as the General Electric double base diode. With suitable modifications in circuitry where necessary, it is also contemplated that a unidirectional current flow device such as a thyratron could be used or a device such as a neon tube could be used.

Figure 3:
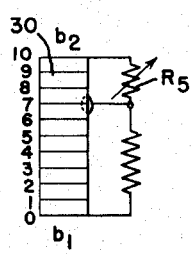
FIG. 3 is a schematic representation of a preferred form of transistor which can be utilized in the embodiments of FIGS. 1 and 2.

Referring now more particularly to FIG. 3 of the drawings wherein is shown a schematic representation of the variable impedance device of the present invention which could be utilized for devices V1, V2, and V3 respectively, it has been found that a form of solid state thyratron known as a double base diode or unijunction transistor may be readily utilized in the inventive circuit. This device operates substantially as follows: A solid bar 30 of a semi-conductor substance, for example, a germanium or silicon solid crystal may have a PN junction formed at one edge at a given point therealong. This junction will form the emitter and in the instant invention may be thought of as a control element. The point on the scale numbered 7 has been chosen by way of illustration as conforming with the 7/10 point operation of the circuit shown by way of example in FIG. 1 and FIG. 2. Initially with a positive ten units of potential applied at one end of the solid crystal and the other end being disposed at zero units of potential the crystal will present a high impedance to current flow and very little current flow through the crystal from end to end will result. Thus very little current flow will occur from the 10/10 point to the point at zero potential through the variable resistor R5. The device will therefore represent a very high impedance to current flow either through the crystal itself or from the emitter at the point marked 7 through the crystal to the base at zero units potential and from the plus 10 units potential point and variable resistor R5 through the emitter. However, assume that a voltage is applied to the emitter such that it equals the 7 units of voltage required. In this case the device will act on an extremely low impedance from the emitter to the base at zero volts and relatively large current flow will result from the physical point removed 7/10 of the length of the crystal through the crystal to the base at zero units potential. This current will flow from the point at ten units potential through the variable resistor R5 to the emitter. In this condition the crystal from the point at zero potential to 7/10 of the distance along the crystal presents an extremely low impedance to current flow such that at the point 7/10 of the total crystal length removed from the zero point there is approximately zero units potential difference. However, between the point marked 7 and the point 10 there appears a very high impedance through the crystal compared to the impedance of the variable resistor and the major portion of current flow will therefore go through the variable resistor. If thus a switch is provided from a source capable of generating 7 units of voltage to the emitter, then upon closing of the switch the operation of the semi-conductor in this manner can be performed. In the instant circuit the capacitor for C1 of FIG. 1 and the capacitor C4 of FIG. 2 each act as the switching circuit. For a description of this type of device and its applications in greater detail reference is made to U.S. Patent No. 2,769,926 of Israel A. Lesk for Non-Linear Resistance Device, issued November 6, 1956.

While not to be construed as limiting the scope of the invention described herein, the below listed values represent successfully operating illustrative components which can be utilized in the devices of FIGS. 1 and 2.

FIG. 1

| Component: | | Value or designation |
|---|---|---|
| B1 | volts | 22.5 |
| R1 | ohms | 110 |
| R2 | do | 4.7K |
| $R_L$ | do | 68K |
| C1 | mfd | .02 |
| C2 | mfd | .1 |
| C3 | mfd | .1 |
| CR1 | | 1N537 |
| CR2 | | 1N537 |

FIG. 2

| Component: | | Value or designation |
|---|---|---|
| B1' | volts | 22.5 |
| R2' | ohms | 6.2K |
| R2'' | do | 6.2K |
| $R_L'$ | do | 100K |
| C1' | mfd | .02 |
| C2' | mfd | 15 |
| C3' | mfd | 50 |
| C4 | mfd | .02 |
| C5 | mfd | 7.5 |
| C6 | mfd | 25 |
| CR1' | | 1N537 |
| CR2' | | 1N537 |
| CR3 | | 1N537 |
| CR4 | | 1N537 |

Legend—mfd. = microfarad.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

What is claimed is:

1. A D.C. to D.C. voltage multiplier comprising a solid state thyratron comprising an emitter and a pair of bases, a constant D.-C. voltage source disposed between said bases, a first capacitor charged by said D.-C. source to approximately source voltage, a second capacitor connecting said emitter to one of said bases, and being connected in series with said first capacitor to thereby alternately become charged up to solid state thyratron firing potential and to discharge, so that on subsequent charging and discharging cycles the second capacitor will add the voltage there across to the first capacitor voltage to thereby lift the voltage at the higher charged plate of the first capacitor to above D.-C. source voltage.

2. A D.-C. to D.-C. voltage amplifier comprising a signal translating device having at least a first and a second ohmic electrode, and a rectifying junction associated therewith in a region affected by an electric potential existing between said ohmic electrodes, D.-C. source means to provide a potential difference between said ohmic electrodes, a first capacitor charged by said D.-C. source means to substantially the source potential, a second capacitor connected between one of said ohmic electrodes and said junction and connected in series with said first capacitor to thereby lift the voltage across said first capacitor an amount in accordance with the charge on said first capacitor to thereby provide an output potential at said first capacitor which is above the D.-C. source potential.

3. A D.-C. to D.-C. voltage amplifier comprising a semi-conductor device having at least two spaced ohmic electrodes and a rectifying junction associated therewith in a region affected by an electric potential existing between said ohmic electrodes, D.-C. source means to supply a D.-C. potential between said ohmic electrodes, a switch having a first contact connected to the positive terminal of said source and having a second contact connected to one of said ohmic electrodes, a first resistor connected between said switch and said rectifying junction, a first rectifier and a first capacitor in series, the anode of said rectifier being connected to said switch, said first capacitor being connected to said junction, a second capacitor disposed between the negative terminal of said D.-C. source and said junction, the other of said ohmic electrodes being directly coupled to said negative terminal, a second rectifier having its anode connected to the cathode of said first rectifier and an output load impedance including a third capacitor and a second resistor in parallel disposed between the cathode of said second rectifier and said negative terminal, so that upon closing of said switch said first capacitor will become charged to substantially the potential of the D.-C. source and the second capacitor will become charged to a value such that the second capacitor may be rapidly discharged through the semi-conductor, the second rectifier blocking discharge of the first capacitor so that on subsequent cycles the second capacitor voltage will build up the voltage at the junction between the first rectifier and the first capacitor to a predetermined value above the D.-C. source voltage, the voltage above the D.-C. source being the output taken from the second resistor which D.-C. output is smoothed by said third capacitor.

4. A D.-C. to D.-C. voltage amplifier comprising a first and a second semi-conductor device, each device having at least two spaced ohmic electrodes and a rectifying junction associated therewith in a region affected by an electric potential existing between said ohmic electrodes, D.-C. potential between said two ohmic electrodes of each semi-conductor, a first charging resistor for each semi-conductor connected between the positive terminal of said D.-C. source and the corresponding semi-conductor rectifying junction, a first rectifier and a first capacitor in series, the anode of said first rectifier being connected to the positive terminal of the D.-C. source and the first capacitor being connected to the junction of the first semi-conductor, a series arrangement of a second rectifier and a second capacitor connected between the cathode of the first rectifier and the negative terminal of the D.-C. source, a third and a fourth capacitor, each of said last-named capacitors being disposed between the junction and one ohmic electrode of said first and second semi-conductors respectively, the other ohmic electrode of each of said semi-conductors being connected to the positive terminal of said D.-C. source, a third rectifier and a fifth capacitor in series, the third rectifier having its plate connected to the cathode of the second rectifier and the fifth capacitor being connected to the second semi-conductor at the rectifying junction of the second semi-conductor, a fourth rectifier and a sixth capacitor in series, the anode of the fourth rectifier being connected to the cathode of the third rectifier and the sixth capacitor being connected to the negative terminal of the D.-C. source and an output load resistor disposed across the sixth capacitor to thereby provide an output voltage across the load resistor greater than the D.-C. source voltage.

5. Apparatus for transforming the output of a direct current voltage source having a given terminal voltage to a second voltage across a load greater than said terminal voltage comprising a first capacitance, a non-linear impedance device including a control element, said device presenting a relatively low impedance upon the application of a voltage of a chosen value to said control element, means for connecting said first capacitance and said device in circuit with said source to charge said first capacitance and to apply voltage to said control element, the application of said chosen voltage to said control element causing said first capacitance to discharge through said device whereby the voltage at said control element falls below said chosen value and said first capacitance is permitted to recharge, a second capacitance connected in circuit with said source and connected in series arrangement with said first capacitance, the voltage output of said apparatus when said first capacitance is in the recharged state being substantially the sum of the values of said terminal voltage and the voltage on said first capacitance.

6. The apparatus defined in claim 5 wherein said non-linear impedance device is a unijunction transistor.

7. Apparatus for transforming the output of a direct current voltage source having a given terminal voltage to a second voltage across a load greater than said terminal voltage comprising a first capacitance, a unijunction transistor comprising an emitter and first and second bases, means for connecting said source across said bases to provide a potential gradient across said transistor, means for connecting said source to said emitter and said first capacitance to apply voltage to said emitter and charge said first capacitance, the application of a chosen value of voltage to said emitter providing a low impedance between said emitter and one of said bases whereby said first capacitance is permitted to discharge through said device and whereby the voltage at said control element falls below said chosen voltage thereby causing said first capacitance to be recharged, a second capacitance in circuit to be charged by said source and connected in series arrangement with said first capacitance, the voltage output of said apparatus when said first capacitance is in the charged state being substantially the sum of the values of the terminal voltage and the voltage on said first capacitance.

8. Apparatus for transforming the output of a direct current voltage source having a given terminal voltage to a second voltage across a load greater than said terminal voltage comprising a unijunction transistor comprising an emitter and first and second bases, a first capacitance connecting said emitter to said second base, means for connecting said source across said bases to provide a potential gradient across said transistor from said first to said second base and for applying voltage from said source to said emitter and said first capacitance to charge said first capacitance, the application of a given value of voltage to said emitter resulting in a low impedance path to current flow from said emitter to said second base and the discharge of said first capacitance through said emitter to second base path with a decrease in voltage level at said emitter below said chosen value, said first capacitance being caused to be recharged thereby, a second capacitance in circuit with said source to be charged thereby and connected in series arrangement with said first capacitance, the voltage output of said apparatus when said first capacitance is in the charged state being substantially the sum of the values of said terminal voltage and the voltage on said first capacitance.

9. Apparatus for transforming the output of a direct current voltage source having a given terminal voltage to a second voltage across a load greater than said terminal voltage comprising a unijunction transistor comprising an emitter and first and second bases, the first capacitance connecting said emitter to said second base, means for connecting said source across said bases to provide a potential gradient across said transistor from said first to said second base and for applying voltage from said source to said emitter and said first capacitance, the application of a given value of voltage to said emitter resulting in a low impedance path to current flow from said emitter to said second base and the discharge of said first capacitance through said emitter to second base path, with a decrease in voltage level at said emitter below said chosen value, said first capacitance being caused to be recharged thereby, a second capacitance in circuit with said source to be charged thereby and connected in series arrangement with said first capacitance, first unidirectional conducting means connected between said source and said second capacitance to permit its charging and to prevent its discharging, a third capacitance connected across the series arrangement of said first and second capacitances, second unidirectional current means connected between the junction of said second and third capacitances to permit the charging and to prevent the discharging of said third capacitance, the voltage across said third capacitance being substantially the sum of said terminal voltage and the charge on said first capacitance.

References Cited in the file of this patent

UNITED STATES PATENTS

| | | |
|---|---|---|
| 1,992,908 | Cockroft | Feb. 26, 1935 |
| 2,072,278 | Schade | Mar. 2, 1937 |
| 2,769,926 | Lesk | Nov. 6, 1956 |
| 2,773,200 | Guggi | Dec. 4, 1956 |

FOREIGN PATENTS

| | | |
|---|---|---|
| 618,624 | Great Britain | Feb. 24, 1949 |